United States Patent [19]
Borling

[11] Patent Number: 6,141,947
[45] Date of Patent: Nov. 7, 2000

[54] DYNAMIC DRIVE AND BRAKE SYSTEM

[75] Inventor: Al Borling, Valley City, Ohio

[73] Assignee: MTD Products INC, Cleveland, Ohio

[21] Appl. No.: 09/326,060

[22] Filed: Jun. 4, 1999

Related U.S. Application Data

[60] Provisional application No. 60/088,315, Jun. 5, 1998.

[51] Int. Cl.[7] .............................. A01D 34/64; A01D 69/00
[52] U.S. Cl. .............................................................. 56/10.8
[58] Field of Search .......................... 56/10.2 U, 10.2 A, 56/10.8, 11.8, 11.7, 11.6, 11.5, 11.3; 180/95, 103

[56] References Cited

U.S. PATENT DOCUMENTS

| | | |
|---|---|---|
| 1,340,120 | 5/1920 | Peck . |
| 4,016,709 | 4/1977 | Hauser et al. ............................ 56/10.2 |
| 4,128,017 | 12/1978 | Clarke ................................. 74/230.17 |
| 4,878,360 | 11/1989 | Viegas ....................................... 62/239 |

FOREIGN PATENT DOCUMENTS

| | | | |
|---|---|---|---|
| 0216061 | 7/1986 | European Pat. Off. ................... 34/64 |
| 0717920 | 6/1996 | European Pat. Off. ................... 34/68 |
| 251280 | 9/1912 | Germany ................................. 47/10 |
| 394307 | 4/1924 | Germany ................................. 47/9 |

Primary Examiner—Robert E. Pezzuto
Attorney, Agent, or Firm—Emerson & Associates; Roger D. Emerson; Timothy D. Bennett

[57] ABSTRACT

A dynamic drive and brake system is provided. To accelerate the mower in a forward direction, the operator depresses the acceleration pedal, overcoming the biasing force of the acceleration spring. This causes the double idler pulley system to pivot from an inoperative or de-clutched condition to an operative condition. The farther the accelerator pedal is depressed, the more the double idler pulley system pivots and, correspondingly, the more tension is applied to the first belt. The increased tension in the first belt causes the middle pulley member to move in a downward direction and therefore decreases the diameter of the first belt about the double pulley shaft. The movement of the middle pulley member simultaneously increases the diameter of the second belt about the double pulley shaft. This increases the tension in the second belt which tension is absorbed by the idler spring that permits the idler pulley to pivot in a clockwise direction as seen in FIGS. 2–3. The particular diameters of the first and second belts about the double pulley provide increased rotational speed to the transmission input pulley. This increased rotational speed is then transferred to the transmission and on to the back drive axle and back wheels for corresponding acceleration of the mower.

7 Claims, 4 Drawing Sheets

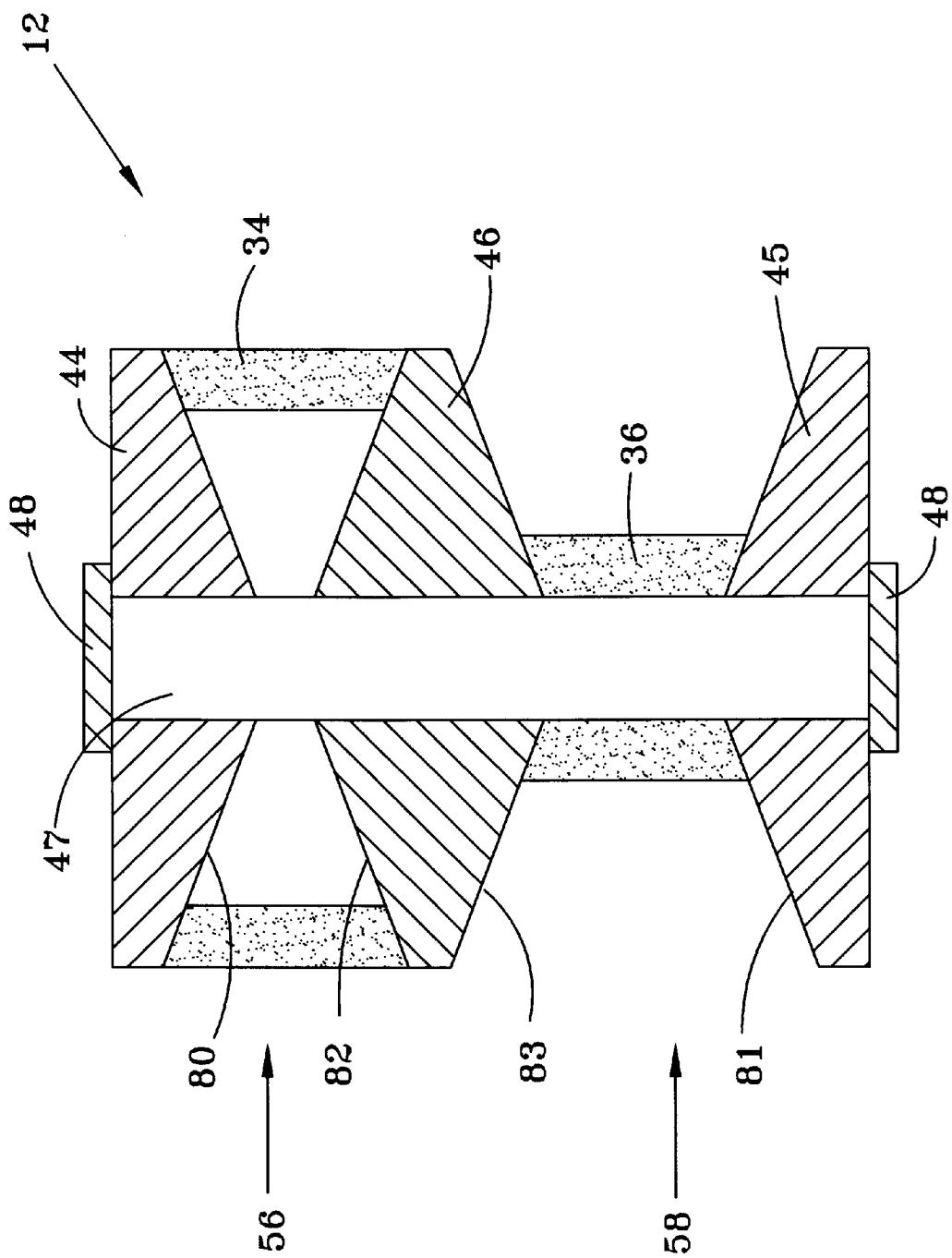

DYNAMIC DRIVE AND BRAKE SYSTEM

This Utility Patent Application claims priority from Provisional Patent Application Serial No. 60/088,315 filed Jun. 5, 1998.

BACKGROUND OF THE INVENTION

1. Field of Invention

This invention pertains to the art of methods and apparatuses for driving and braking vehicles, and more specifically to methods and apparatuses for dynamically driving and braking a lawn care device such as a mower.

2. Description of the Related Art

It is well known to provide driving and braking systems for vehicles, such as a lawn care device. Typically, mowers that provide easy operator control use a complex transmission and/or one or more hydrostatic units to convert power from an engine to drive wheels. Braking systems are similarly complex and may require expensive hydraulic systems. Therefore, driving and braking systems known in the art, though effective, are difficult to construct, add considerable weight to the vehicle and are expensive.

Another difficulty with known driving systems for riding mowers is that they utilize various hand levers and foot pedals in a manner that is not intuitive for the operator. In other words, a "break-in" time is typically required for the operator to become highly proficient with the mower's various levers and pedals. Since nearly every adult person can operate an automobile, a riding mower designed to operate in a manner very similar to an automobile would provide intuitive controls.

The present invention provides methods and apparatuses for a dynamic drive and brake system for a riding mower that is easy and intuitive to operate without requiring the complex and expensive hydrostatic and hydraulic systems commonly known. The difficulties inherit in the art are therefore overcome in a way that is simple and efficient while providing better and more advantageous results.

SUMMARY OF THE INVENTION

One advantage of the present invention is that it is easy to manufacture and can be made economically.

Another advantage of the current invention is that it provides a control system for riding lawn mowers that is similar to control systems for automobiles. This makes the operation of riding lawn mowers simple and more intuitive. When an operator takes his or her foot off of the accelerator pedal, the mower will remain neutral and will not accelerate even when the gear shift is in the drive position. Additionally, the system is dynamic in that the speed of the mower increases as the accelerator pedal is increasingly depressed.

Another advantage of the present invention is that it reduces vibrations, commonly referred to as "belt flutter" in belt driven applications.

Yet another advantage of the current invention is that the configuration of the system and the pulleys therein provide for very smooth acceleration of the vehicle.

Still another advantage of the current invention is added safety features. The system will not permit the mower to start unless the accelerator pedal is fully released.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 4 is a cross-sectional view of the double pulley showing the first and second pulley portions.

DESCRIPTION OF THE PREFERRED EMBODIMENT

Figure 1:
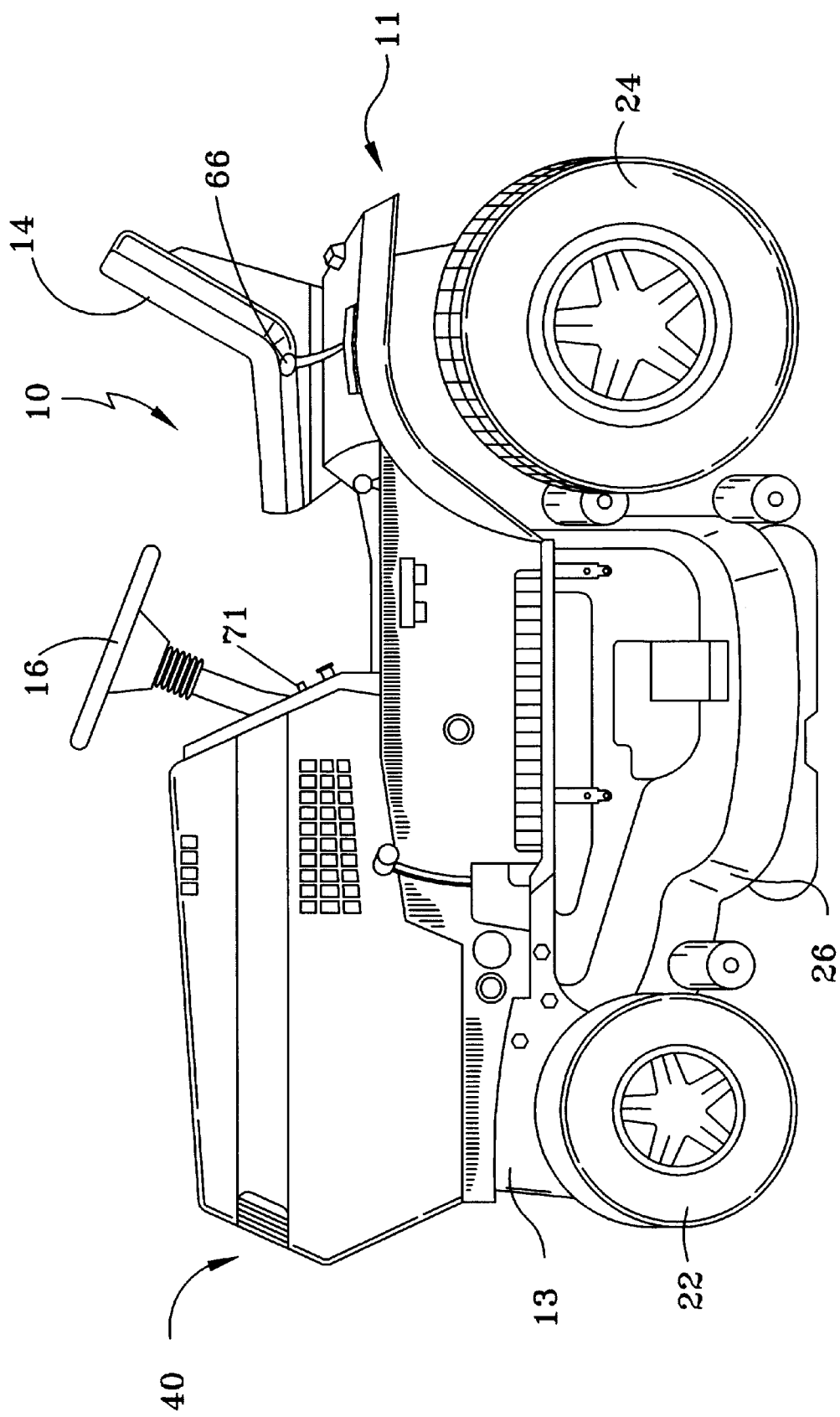
FIG. 1 is a side elevation view of a riding mower equipped with the dynamic drive and brake system of the present invention.

Referring now to the drawings wherein the showings are for purposes of illustrating a preferred embodiment of the invention only and not for purposes of limiting the same, FIG. 1 shows a mower 10 which is equipped with a dynamic drive and brake system 11 in accordance with this invention. This preferred embodiment is directed to a riding lawn mower but the invention is applicable to other mowers, other vehicles, and other applications as well. The mower 10 includes a frame 13, an operator seat 14 and a steering implement 16 for steering front wheels 22. An engine 40 is used to drive back wheels 24 and to rotate one or more cutting blades (not shown) within a mower deck 26. The operation of the cutting blades is well known in the art and thus will not be discussed further in this specification. It should be noted that this invention is equally applicable to a mower using the front wheels as the drive wheels.

Figure 2:
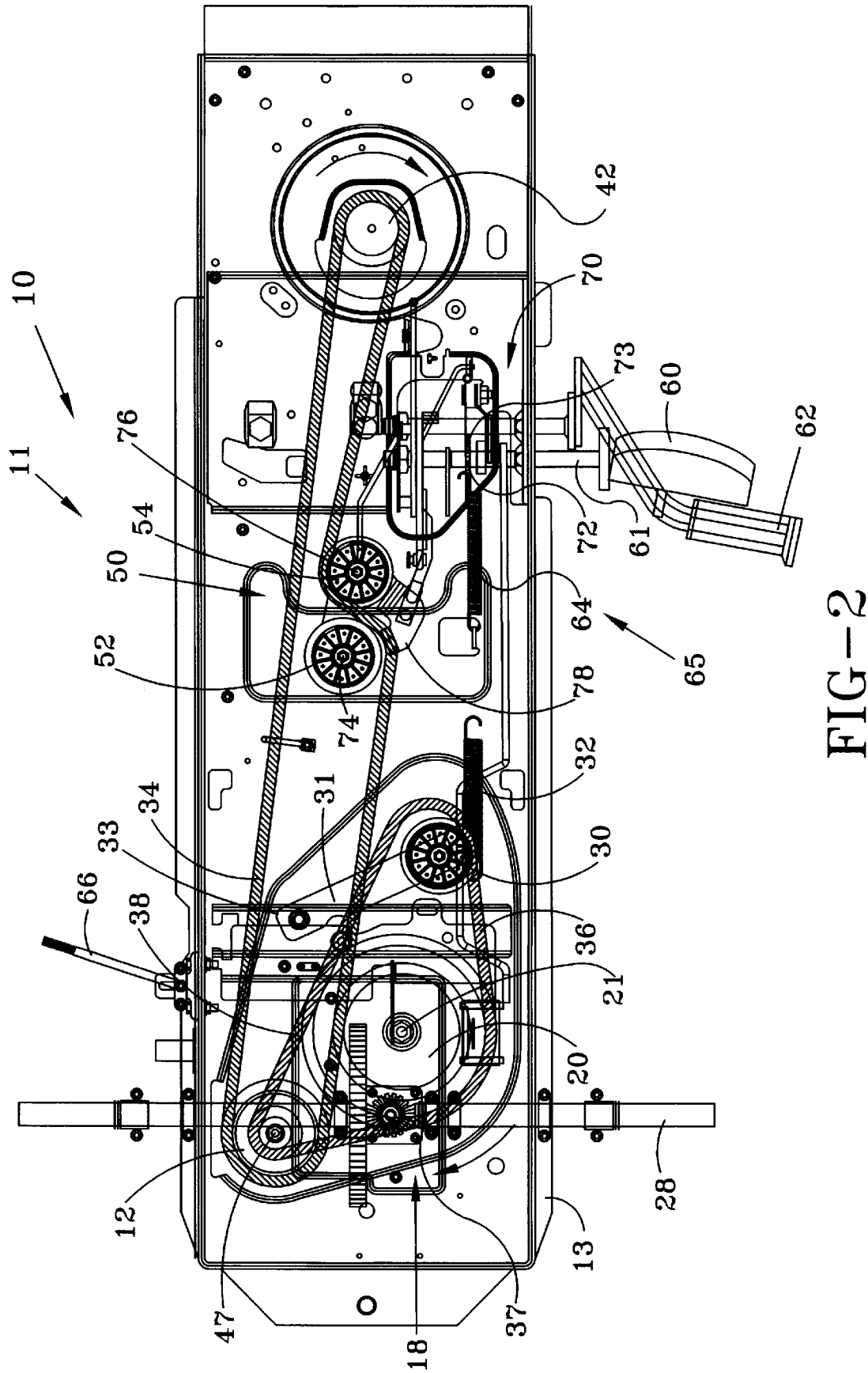
FIG. 2 is a simplified cut-a-way plan view of the riding mower of FIG. 1 showing the first and second belts of the dynamic drive and brake system positioned for low speed operation.
Figure 3:
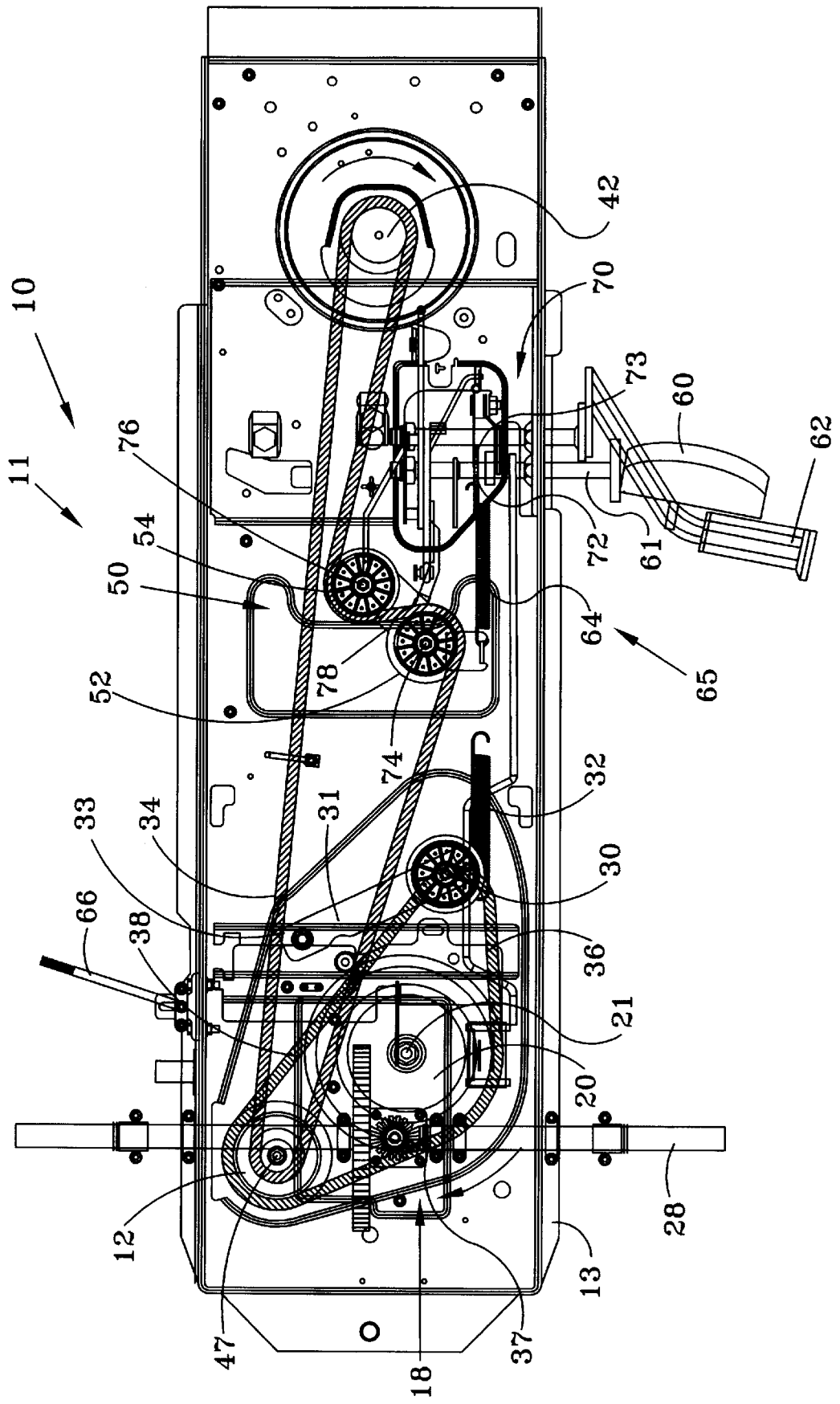
FIG. 3 is a simplified cut-a-way plan view similar to FIG. 2 except showing the first and second belts of the dynamic drive and brake system positioned for high speed operation.

With reference now to FIGS. 1–3, the dynamic drive and brake system 11 of this invention includes an engine drive pulley 42 that is rotatably connected to the engine 40 in any manner commonly known in the art. A first belt 34 operatively connects the engine drive pulley to a double pulley 12 for selective rotation of the double pulley 12. An engaging means 65 is provided for use to selectively loosen and tighten the first belt 34. Although the engaging means 65 may be of any type chosen with sound engineering judgment, in the preferred embodiment the engaging means 65 includes a double idler pulley system 50, having first and second double idler pulleys 52, 54. This will be discussed further below. A second belt 36 operatively connects the double pulley 12 to a transmission input pulley 20 for selective rotation of the transmission input pulley 20. The transmission input pulley 20 is fixedly connected to a driven pulley shaft 21 that is operatively connected to a transmission 18. The transmission 18 is operatively connected to a back drive axle 28 for selective rotation of the back wheels 24 that are operatively connected to the back drive axle 28. The transmission 18 may be of any type chosen with sound engineering judgement that receives input from a rotating shaft such as driven pulley shaft 21. It should be noted that the dynamic drive and brake system 11 of this invention is applicable to any type of driven pulley such as the transmission input pulley 20 shown in this preferred embodiment. In the preferred embodiment, the axis of the driven pulley shaft 21 is fixed with respect to the frame 13. In other words, the transmission input pulley 20 and the driven pulley shaft 21 are rotatable with respect to the frame 13 but the pulley 20 and shaft 21 do not move relative to the frame 13 in any other way. An idler pulley 30 is used to selectively loosen and tighten the second belt 36 as will be discussed further below.

With reference now to FIGS. 2 and 4, the double pulley 12, also referred to as a variable speed pulley, includes first and second end pulley members 44, 45 rotatably connected to the ends of a double pulley shaft 47. The double pulley shaft is rotatable within a pair of bearings 48. A middle pulley member 46 is rotatably and slidably connected to the double pulley shaft 47. By slidably connected it is meant that the middle pulley member 46 is slidable along the axis of the double pulley shaft 47. As shown in FIG. 4, the first and second end pulley members 44, 45 have angled surfaces 80, 81 respectively for operative contact with the first and second belts 34, 36 respectively. The middle pulley member 46 similarly has first and second angled surfaces 82, 83 for operative contact with the first and second belts 34, 36 respectively. In this way, the angled surface 80 of the first end pulley member 44 and the first angle surface 82 of the middle pulley member 46 form a first pulley portion 56 for receiving the first belt 34. Similarly, the angled surface 81 of the second end pulley member 45 and the second angled surface 83 of the middle pulley member 46 form a second pulley portion 58 for receiving the second belt 36.

With reference to FIG. 4, the angled surfaces 80, 81, 82, 83 permit the first and second pulley portions 56, 58 to provide varying diameters for the first and second belts 34, 36 about the double pulley shaft 47. This will be discussed further below. It should be noted, however, that the angled surfaces 80, 81, 82, 83 permit, depending on the position of the middle pulley member 46, the first and second belts 34, 36 to be positioned with the smallest possible inner diameter equal to the outside diameter of the double pulley shaft 47. This is the condition of the second belt 36 shown in FIG. 4. This provides for maximum speed variation (diameter ratios are maximum) for a given size of double pulley 12.

With reference now to FIGS. 2–4, in the preferred embodiment, the axis of the double pulley shaft 47 is fixed with respect to the frame 13. In other words, the first and second end pulley members 44, 45 and the double pulley shaft 47 are rotatable with respect to the frame 13 but the pulley members 44, 45 and shaft 47 do not move relative to the frame 13 in any other way. This can be visualized by comparing FIG. 2 to FIG. 3. In both FIGURES, the double pulley 12 is positioned identically with respect to the frame 13 even though FIG. 2 shows a low speed condition and FIG. 3 shows a high speed condition. It is known in the art to use a double pulley that is movably mounted with respect to the frame 13. Since the axis of the double pulley 12 of this invention is fixedly mounted with respect to the frame 13, a method is required to "take-up" any loose belt as the diameters of the first and second belts 34, 36 are varied at the double pulley 12. The loose belts are taken-up by the idler pulley 30 as will be described below.

With continuing reference to FIGS. 2–4, when the middle pulley member 46 slides upward along the double pulley shaft 47, as shown in FIG. 4, the first pulley portion 56 forces the first belt 34 to a relatively large diameter about the double pulley shaft 47 while the second pulley portion 58 forces the second belt 36 to a relatively small diameter about the double pulley shaft 47. This is the condition shown in FIG. 4 and FIG. 2. In this condition, the pulley diameter ratios provide that the engine pulley 42 provides the lowest speed to the double pulley 12 while simultaneously, the double pulley 12 provides the lowest speed to the transmission input pulley 20. All such pulley diameter ratios are well known to those skilled in the art and thus further discussion is not necessary. It should be noted, however, that when the middle pulley member 46 slides downward along the double pulley shaft 47, the first pulley portion 56 forces the first belt 34 to a relatively small diameter about the double pulley shaft 47 while the second pulley portion 58 forces the second belt 36 to a relatively large diameter about the double pulley shaft 47. In this condition, shown in FIG. 3, the pulley diameter ratios provide that the engine pulley 42 provides the highest speed to the double pulley 12 while simultaneously, the double pulley 12 provides the highest speed to the transmission input pulley 20. It should also be noted that when the first belt 34 is positioned in the smallest diameter about the double pulley shaft 47, the inside surface of the first belt 34 may contact the outer surface of the double pulley shaft 47. Similarly, as shown in FIG. 4, when the second belt 36 is positioned in the smallest diameter about the double pulley shaft 47, the inside surface of the second belt 36 may contact the outer surface of the double pulley shaft 47. Thus, the double pulley 12 of this invention does not have the collar (not shown) ordinarily provided on double pulleys that limits the travel of a belt toward the double pulley shaft. This provides for a maximum range of pulley diameter ratios (and resultant speeds) given the size of the double pulley 12.

With reference now to FIGS. 2–3, the idler pulley 30 is rotatably connected to an idler pulley bracket 31 that is pivotably connected to the frame 13 at a first end 33. An idler pulley spring 32 biases the idler pulley 30 toward an engaged position (counterclockwise pivot position as viewed in FIGS. 2–3) for the second belt 36. Since both the axis of the double pulley 12 and the axis of the transmission input pulley 20 are fixedly mounted with respect to the frame 13, it should be understood that the idler pulley 30 takes up all the slack in the second belt 36. In fact, the idler pulley 30 assists in taking up any slack in the first belt 34 as well. This is true because tension changes in the first belt 34 are transmitted to the second belt 36 through the double pulley 12. An important aspect of this invention is that the idler pulley 30 is positioned opposite the double pulley 12. In other words, the transmission input pulley 20 is located between the double pulley 12 and the idler pulley 30. This positioning provides advantages for the dynamic drive and brake system 11.

With continuing reference to FIGS. 2–3, one advantage to the positioning of the idler pulley 30 is that the transmission input pulley 20 contacts the second belt 36 at two distinct locations. As commonly known in the art, a driven belt has a tension side and a slack side. The tension side is the portion of the belt that is "upstream" of the drive pulley and therefore is under tension. The slack side is the portion of the belt that is "downstream" of the drive pulley and therefore is not under tension. Preferably, the second belt 36 is driven in a clockwise direction as seen in FIGS. 2–3 by the double pulley 12. Thus, the tension side of the second belt 36 is indicated by reference number 37 and the slack side is indicated by reference number 38. As shown in FIGS. 2–3, the tension side 37 of the second belt 36 is in operative contact with one side of the transmission input pulley 20 and the slack side 38 of the second belt 36 is in operative contact with the other side of the transmission input pulley 20. This double contact of the second belt 36 with the transmission input pulley 20 provides a damper means for vibrations (sometimes referred to as "belt flutter") commonly associated with driven belts as they are driven and adjusted. It should be noted that the double contact of the second belt 36 with the transmission input pulley 20 occurs at all belt positions including at a low speed (FIG. 2) and at a high speed (FIG. 3).

Still referring to FIGS. 2–3, another advantage to the positioning of the idler pulley 30 opposite the double pulley 12 is that the idler pulley 30 can efficiently take up belt slack in the system. When the double idler pulley system 50 is adjusted, the first belt 34 is correspondingly adjusted. This changes the diameter of the first belt 34 at the double pulley 12 and thereby changes the diameter of the second belt 36 at the double pulley 12. The change in the diameter of the second belt 36 changes the tension in the second belt 36. The idler pulley 30 along with the idler spring 32 absorb this change in tension. It is commonly known to use an idler pulley to absorb changing tension in a belt. However, since the idler pulley is typically positioned between a driving pulley (such as double pulley 12 with reference to the second belt 36) and a driven pulley (such as the transmission input pulley 20) all tension must be absorbed on one side (either tension or slack) of the belt. For this invention, on the other hand, the idler pulley 30 is positioned to contact both the tension 37 and slack 38 sides of the second belt 36. For this reason, the idler pulley 30 of this invention must only move about half the distance as compared to an idler pulley positioned only on one side of a belt to absorb the same amount of tension change. This permits the idler spring 32 to be sized with a much lower spring constant than typically required for an idler spring. It should also be understood that this arrangement for the idler pulley 30 provides for very smooth acceleration.

With reference now to FIGS. 2–4, the first and second double idler pulleys 52, 54 of the double idler pulley system 50 are rotatably connected to first and second idler pulley shafts 74, 76 respectively, that are themselves operatively connected to a double idler pulley bracket 78. The idler pulley bracket 78 is pivotably connected to the frame 13 for clockwise and counterclockwise movement as seen in FIGS. 2–3. This permits the double idler pulley system 50 to take up large amounts of loose belt (first belt 34) with relatively small amounts of movement. The double idler pulley system 50 can be positioned as shown in FIG. 2 where the first and second double idler pulleys 52, 54 are approximately side by side along the longitudinal axis of the mower 10. In this condition the first belt 34 is moved to a relatively large diameter at the double pulley 12 as shown in FIG. 4. Alternately, the double idler pulley system 50 can be positioned as shown in FIG. 3 where the first and second double idler pulleys 52, 54 have been pivoted to a position side by side somewhat more perpendicular to the longitudinal axis of the mower 10. In this condition the first belt 34 is moved to a relatively small diameter at the double pulley 12. It should be understood that the double idler pulley system 50 can be selectively adjusted to any position between and including those shown in FIGS. 2 and 3. It should be noted that the double idler pulley system 50 contacts the slack side of the first belt 34 and therefore provides an easy and efficient control.

With reference now to FIGS. 1–3, a gear shift 66 is operatively connected to the transmission 18 and is used to adjust the transmission 18 into three alternate conditions— drive, neutral and reverse. These conditions are well known in the art. Preferably, the engaging means 65 includes an accelerator pedal 60. The accelerator pedal 60 selectively rotates an accelerator rod 61 that is operatively connected to the double idler pulley bracket 78 for pivoting motion of the double idler pulley bracket 78. Thus, the accelerator pedal 60 adjusts the double idler pulley system 50 to vary the speed of the mower 10. An accelerator spring 64 biases the acceleration pedal and rod 60, 61 to a zero acceleration or "de-clutched" condition. Therefore, when the accelerator pedal 60 is not depressed, the mower 10 will not move in a forward direction even when the gear shift 66 is in the drive position. A brake pedal 62 selectively stops the mower 10 by any means chosen with sound engineering judgement.

With continuing reference to FIGS. 1–3, the dynamic drive and brake system 11 of this invention indeed provides dynamic drive and braking for the mower 10. By dynamic it is meant that the speed of the mower 10 responds dynamically corresponding to the position of the acceleration pedal 60. The system is dynamic because during normal operation (that is, any time except when the accelerator pedal 60 is fully released and/or the brake pedal 62 is depressed) the idler pulley 30 maintains both the first and second belts 34, 36 in continuous engagement. When the acceleration pedal 60 is depressed in a forward direction (toward the engine 40 and engine pulley 42) the mower 10 accelerates. When the acceleration pedal 60 is released (the accelerator spring 64 biases the acceleration pedal 60 in a backward direction toward the operator seat 14 and the back drive axle 28) the mower 10 decelerates. It should be noted that this deceleration occurs even when the mower 10 is moving downhill. Thus, the acceleration pedal 60 and the brake pedal 62 of the mower 10 are similar to an automobile having an automatic transmission. Therefore the dynamic drive and brake system 11 of this invention provides intuitive controls for nearly all drivers.

Still referring to FIGS. 1–3, another advantage to the dynamic drive and brake system 11 of this invention is that the riding mower can only be started at the very lowest speed. This is true because the ignition system (not shown) will not permit start up of the engine 40 unless the accelerator pedal 60 is fully released. Then to accelerate the mower 10, the accelerator pedal 60 can be depressed starting at the lowest possible speed.

With reference to FIGS. 1–4, the operation of the dynamic drive and brake system 11 will now be described. To accelerate the mower 10 in a forward direction, the operator starts the engine 40 and places the gear shift 66 into the drive position. Next, the operator depresses the acceleration pedal 60, overcoming the biasing force of the acceleration spring 64. This causes the double idler pulley system 50 to pivot (counterclockwise as shown in FIGS. 2–3) from an inoperative or de-clutched condition to an operative condition. In other words, the first and second double idler pulleys 52, 54 properly engage the first belt 34 to the engine pulley 42 and the double pulley 12. The farther the accelerator pedal 60 is depressed, the more the double idler pulley system 50 pivots and, correspondingly, the more tension is applied to the first belt 34. The increased tension in the first belt 34 causes the middle pulley member 46 to move in a downward direction (as shown in FIG. 4) and therefore decreases the diameter of the first belt 34 about the double pulley shaft 47. The movement of the middle pulley member 46 simultaneously increases the diameter of the second belt 36 about the double pulley shaft 47. This increases the tension in the second belt 36 which tension is absorbed by the idler spring 32 that permits the idler pulley 30 to pivot in a clockwise direction as seen in FIGS. 2–3. The particular diameters of the first and second belts 34, 36 about the double pulley 12 provide increased rotational speed to the transmission input pulley 20. This increased rotational speed is then transferred to the transmission 18 and on to the back drive axle 28 and back wheels 24 for corresponding acceleration of the mower 10.

With continuing reference to FIGS. 1–4, to decelerate the mower 10, the operator partially (or fully depending on the amount of deceleration desired) releases the acceleration pedal 60 thereby permitting the biasing force of the acceleration spring 64 to move the acceleration pedal and rod 60, 61. This causes the double idler pulley system 50 to pivot in a clockwise direction as shown in FIGS. 2–3. This decreases the tension in the first belt 34. The decreased tension in the first belt 34 causes the middle pulley member 46 to move in a upward direction (as shown in FIG. 4) and therefore increases the diameter of the first belt 34 about the double pulley shaft 47. The movement of the middle pulley member 46 simultaneously decreases the diameter of the second belt 36 about the double pulley shaft 47 decreasing the tension in the second belt 36. This decrease in the tension of the second belt 36 tends to create "slack" in the second belt 36. This slack is removed by the idler spring 32 that biases the idler pulley 30 to pivot in a counterclockwise direction as seen in FIGS. 2–3. The particular diameters of the first and second belts 34, 36 about the double pulley 12 provide decreased rotational speed to the transmission input pulley 20. This decreased rotational speed is then transferred to the transmission 18 and on to the back drive axle 28 and back wheels 24 for corresponding deceleration of the mower 10.

The invention has been described with reference to preferred embodiments. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A mower comprising:
   a frame;
   a plurality of wheels including at least a first drive wheel operatively supported by said frame;
   an engine operatively mounted to said frame;
   a mower deck operatively connected to said frame; and,
   a dynamic drive system for use in transferring power from said engine to said at least first drive wheel, said dynamic drive system including,
   A) drive pulley that is selectively rotated by said engine;
   B) a driven pulley that is operatively connected to said at least first drive wheel;
   C) a double pulley having first and second pulley portions;
   D) a first belt operatively connecting said drive pulley to said first pulley portion of said double pulley;
   E) a second belt operatively connecting said second pulley portion of said double pulley to said driven pulley wherein said second belt has a tension side and a slack side, said driven pulley operatively contacting said second belt in first and second distinct locations, said first distinct location being on said tension side of said second belt and said second distinct location being on said slack side of said second belt;
   F) engaging means for use in selectively engaging said first belt to said drive pulley and said double pulley; and,
   G) an idler pulley that is used to take up any slack in said first and second belts.

2. The mower of claim 1 wherein said double pulley comprises:
   a double pulley shaft, said double pulley shaft having an axis that is fixed with respect to said frame.

3. The mower of claim 2 wherein said first and second pulley portions selectively permit said first and second belts respectively to contact said double pulley shaft.

4. The mower of claim 1 wherein said engaging means comprises:
   a double idler pulley system having first and second double idler pulleys rotatably connected to first and second idler pulley shafts respectively, said first and second idler pulley shafts being operatively connected to a double idler pulley bracket that is pivotably connected to said frame, said first belt passing between said first and second double idler pulleys.

5. A mower comprising:
   a frame;
   a plurality of wheels including at least a first drive wheel operatively supported by said frame;
   an engine operatively mounted to said frame;
   a mower deck operatively connected to said frame; and,
   a dynamic drive system for use in transferring power from said engine to said at least first drive wheel, said dynamic drive system including,
   A) a drive pulley that is selectively rotated by said engine;
   B) a driven pulley that is operatively connected to said at least first drive wheel;
   C) a double pulley having first and second pulley portions;
   D) a first belt operatively connecting said drive pulley to said first pulley portion of said double pulley;
   E) a second belt operatively connecting said second pulley portion of said double pulley to said driven pulley wherein said driven pulley is located between said double pulley and said idler pulley;
   F) engaging means for use in selectively engaging said first belt to said drive pulley and said double pulley; and,
   G) an idler pulley that is used to take up any slack in said first and second belts.

6. A mower comprising:
   a frame;
   a plurality of wheels including at least a first drive wheel operatively supported by said frame;
   an engine operatively mounted to said frame;
   a mower deck operatively connected to said frame; and,
   a dynamic drive system for use in transferring power from said engine to said at least first drive wheel, said dynamic drive system including,
   A) a drive pulley that is selectively rotated by said engine;
   B) a driven pulley that is operatively connected to said at least first drive wheel;
   C) a double pulley having first and second pulley portions;
   D) a first belt operatively connecting said drive pulley to said first pulley portion of said double pulley;
   E) a second belt operatively connecting said second pulley portion of said double pulley to said driven pulley;
   F) engaging means for use in selectively engaging said first belt to said drive pulley and said double pulley wherein said engaging means comprises:
   a double idler pulley system having first and second double idler pulleys rotatably connected to first and second idler pulley shafts respectively, said first and second idler pulley shafts being operatively connected to a double idler pulley bracket that is pivotably connected to said frame, said first belt passing between said first and second double idler pulleys;

an accelerator pedal that selectively rotates an accelerator rod that is operatively connected to said double idler pulley bracket;

an accelerator spring that biases said acceleration pedal and said accelerator rod toward a zero acceleration condition; and, F) an idler pulley that is used to take up any slack in said first and second belts.

7. A mower comprising:

a frame;

a plurality of wheels including at least a first drive wheel operatively supported by said frame;

an engine operatively mounted to said frame;

a mower deck operatively connected to said frame; and, a dynamic drive system for use in transferring power from said engine to said at least first drive wheel, said dynamic drive system including, A) a drive pulley that is selectively rotated by said engine;

B) a driven pulley that is operatively connected to said at least first drive wheel;

C) a double pulley having first and second pulley portions;

D) a first belt operatively connecting said drive pulley to said first pulley portion of said double pulley;

E) a second belt operatively connecting said second pulley portion of said double pulley to said driven pulley wherein said second belt has a tension side and a slack side, said driven pulley operatively contacting said second belt in first and second distinct locations, said first distinct location being on said tension side of said second belt and said second distinct location being on said slack side of said second belt;

wherein said double pulley includes a double pulley shaft having an axis that is fixed with respect to said frame;

wherein said driven pulley is located between said double pulley and said idler pulley;

F) engaging means for use in selectively engaging said first belt to said drive pulley and said double pulley wherein said engaging means includes, a double idler pulley system having first and second double idler pulleys rotatably connected to first and second idler pulley shafts respectively, said first and second idler pulley shafts being operatively connected to a double idler pulley bracket that is pivotably connected to said frame, said first belt passing between said first and second double idler pulleys;

an accelerator pedal that selectively rotates an accelerator rod that is operatively connected to said double idler pulley bracket; and, an accelerator spring that biases said acceleration pedal and said accelerator rod toward a zero acceleration condition;

G) an idler pulley that is used to take up any slack in said first and second belts;

H) a transmission that is operatively connected to said at least first drive wheel; and, I) a driven pulley shaft that is operatively connected to said transmission, said driven pulley being fixedly connected to said driven pulley shaft, said driven pulley shaft having an axis that is fixed with respect to said frame.

\* \* \* \* \*